(12) United States Patent
Liu et al.

(10) Patent No.: US 11,410,268 B2
(45) Date of Patent: Aug. 9, 2022

(54) IMAGE PROCESSING METHODS AND APPARATUSES, ELECTRONIC DEVICES, AND STORAGE MEDIA

(71) Applicant: BEIJING SENSETIME TECHNOLOGY DEVELOPMENT CO., LTD, Beijing (CN)

(72) Inventors: Wentao Liu, Beijing (CN); Chen Qian, Beijing (CN)

(73) Assignee: BEIJING SENSETIME TECHNOLOGY DEVELOPMENT CO., LTD, Beijing (CN)

( * ) Notice: Subject to any disclaimer, the term of this patent is extended or adjusted under 35 U.S.C. 154(b) by 436 days.

(21) Appl. No.: 16/454,826

(22) Filed: Jun. 27, 2019

(65) Prior Publication Data

US 2019/0370934 A1    Dec. 5, 2019

Related U.S. Application Data

(63) Continuation of application No. PCT/CN2018/124318, filed on Dec. 27, 2018.

(30) Foreign Application Priority Data

May 31, 2018 (CN) .......................... 201810553503.X

(51) Int. Cl.
*G06T 3/00* (2006.01)
*G06T 3/40* (2006.01)

(52) U.S. Cl.
CPC .......... *G06T 3/0093* (2013.01); *G06T 3/0012* (2013.01); *G06T 3/4007* (2013.01)

(58) Field of Classification Search
CPC ......... G06T 3/0093; G06T 2207/30196; G06T 2207/30201; G06T 3/4007; G06T 3/0012
(Continued)

(56) References Cited

U.S. PATENT DOCUMENTS

2021/0042975 A1*   2/2021   Simpson ................... G06T 3/40

FOREIGN PATENT DOCUMENTS

CN    104850847 A    8/2015
CN    105447823 A    3/2016
(Continued)

OTHER PUBLICATIONS

Harari, Daniel, et al. "A computer-based method for the assessment of body-image distortions in anorexia-nervosa patients." IEEE Transactions on Information Technology in Biomedicine 5.4 (2001): 311-319. (Year: 2001).*

(Continued)

*Primary Examiner* — Geoffrey E Summers
(74) *Attorney, Agent, or Firm* — Syncoda LLC; Feng Ma

(57) ABSTRACT

An image processing method includes: performing inspection on an image to be processed, and determining a contour line of a target object in the image to be processed and regions of the target object; determining, for a selected first region, first adjustment parameters of target pixel points in the first region according to set parameters; determining, for a second region adjacent to the first region, second adjustment parameters of reference pixel points in the second region; and adjusting the image to be processed according to the first and second adjustment parameters to determine an adjusted image.

17 Claims, 14 Drawing Sheets

(58) Field of Classification Search
USPC .......................................................... 382/293
See application file for complete search history.

(56) References Cited

FOREIGN PATENT DOCUMENTS

| | | | |
|---|---|---|---|
| CN | 106558040 | A | 4/2017 |
| CN | 107578371 | A | 1/2018 |
| CN | 107578380 | A | 1/2018 |
| CN | 107730444 | A | 2/2018 |
| CN | 107808137 | A | 3/2018 |
| JP | 2004318204 | A | 11/2004 |
| JP | 2008123086 | A | 5/2008 |
| JP | 2012038357 | A | 2/2012 |
| JP | 2014002445 | A | 1/2014 |
| JP | 2015125519 | A | 7/2015 |
| JP | 2016085579 | A | 5/2016 |
| JP | 2018063681 | A | 4/2018 |

OTHER PUBLICATIONS

Abramson, Jay, et al. Precalculus. 2014. pp. 729-746. (Year: 2014).*
Zhou, Shizhe, et al. "Parametric reshaping of human bodies in images." ACM transactions on graphics (TOG) 29.4 (2010): 1-10. (Year: 2010).*
Daniel Harari et al., "A Computer-Based Method for the Assessment of Body-Image Distortions in Anorexia-Nervosa Patients", IEEE Transactions on Information Technology in Biomedicine, United States, IEEE, Dec. 31, 2001 (Documents indicating well-known arts) vol. 5, No. 4, pp. 311-319.
First Office Action of Japanese Application No. 2020-517519, dated Apr. 30, 2021.
Second Office Action of Korean Application No. 10-2019-7038720, dated May 31, 2021.
International Search Report in the international application No. PCT/CN2018/124318, dated Mar. 27, 2019.
English translation of the Written Opinion of the International Search Authority in the international application No. PCT/CN2018/124318, dated Mar. 27, 2019.
First Office Action of the Korean application No. 10-2019-7038720, dated Nov. 27, 2020.
Decision of Refusal of the Japanese application No. 2020-517519, dated Aug. 20, 2021.
First Office Action of the Chinese application No. 201810553503.X, dated Aug. 30, 2021.
Notice of Allowance of the Korean application No. 10-2019-7038720, dated Feb. 24, 2022.

* cited by examiner

IMAGE PROCESSING METHODS AND APPARATUSES, ELECTRONIC DEVICES, AND STORAGE MEDIA

CROSS-REFERENCE TO RELATED APPLICATIONS

The present application is a U.S. continuation application of International Application No. PCT/CN2018/124318 filed on Dec. 27, 2018, which claims benefit of Chinese Patent Application No. 201810553503.X filed on May 31, 2018. The disclosures of these applications are hereby incorporated by reference in their entirety.

BACKGROUND

Image beautification refers to processing image information using a computer to meet people's visual psychology or application needs. A person in an image is usually beautified to produce effects such as slimming. In the related art, a region needing to be adjusted in an image may be selected, and adjustment parameters may be set to adjust the region to produce effects such as slimming. However, adjustment modes in the related art may cause different regions of the image to be uncoordinated, and image distortion may occur.

SUMMARY

The present disclosure relates to the field of computer technologies, and in particular, to image processing methods and apparatus, electronic devices, and storage media.

The present disclosure provides image processing methods and apparatuses, electronic devices, and storage media.

According to one aspect of the present disclosure, an image processing method is provided, including: performing inspection on an image to be processed, and determining a contour line of a target object in the image to be processed and a plurality of regions of the target object; determining, for a selected first region in the plurality of regions, first adjustment parameters of a plurality of target pixel points in the first region according to set parameters, where the plurality of target pixel points includes a first pixel point on the contour line and a third pixel point inside the contour line; determining, for a second region adjacent to the first region in the plurality of regions, second adjustment parameters of a plurality of reference pixel points in the second region, where the plurality of reference pixel points includes a second pixel point on the contour line and a fourth pixel point inside the contour line; and adjusting the image to be processed according to the first adjustment parameters and the second adjustment parameters to determine an adjusted image.

According to one aspect of the present disclosure, an image processing apparatus is provided, including: a memory storing processor-executable instructions; and a processor arranged to execute the stored processor-executable instructions to perform steps of: performing inspection on an image to be processed, and determine a contour line of a target object in the image to be processed and a plurality of regions of the target object; determining, for a selected first region in the plurality of regions, first adjustment parameters of a plurality of target pixel points in the first region according to set parameters, wherein the plurality of target pixel points comprises a first pixel point on the contour line and a third pixel point inside the contour line; determining, for a second region adjacent to the first region in the plurality of regions, second adjustment parameters of a plurality of reference pixel points in the second region, wherein the plurality of reference pixel points comprises a second pixel point on the contour line and a fourth pixel point inside the contour line; and adjusting the image to be processed according to the first adjustment parameters and the second adjustment parameters to determine an adjusted image.

According to one aspect of the present disclosure, an image processing apparatus is provided, including: a detecting module, configured to perform inspection on an image to be processed, and determine a contour line of a target object in the image to be processed and a plurality of regions of the target object; a first adjustment parameter determining module, configured to determine, for a selected first region in the plurality of regions, first adjustment parameters of a plurality of target pixel points in the first region according to set parameters, where the plurality of target pixel points includes a first pixel point on the contour line and a third pixel point inside the contour line; a second adjustment parameter determining module, configured to determine, for a second region adjacent to the first region in the plurality of regions, second adjustment parameters of a plurality of reference pixel points in the second region, where the plurality of reference pixel points includes a second pixel point on the contour line and a fourth pixel point inside the contour line; and an adjustment module, configured to adjust the image to be processed according to the first adjustment parameters and the second adjustment parameters to determine an adjusted image.

According to one aspect of the present disclosure, an electronic device is provided, including: a processor; and a memory configured to store processor-executable instructions; where the processor is configured to execute the foregoing image processing method.

According to one aspect of the present disclosure, a non-transitory computer-readable storage medium is provided, having stored thereon computer instructions that, when executed by a processor, cause the processor to perform an image processing method, the method including: performing inspection on an image to be processed, and determining a contour line of a target object in the image to be processed and a plurality of regions of the target object; determining, for a selected first region in the plurality of regions, first adjustment parameters of a plurality of target pixel points in the first region according to set parameters, wherein the plurality of target pixel points comprises a first pixel point on the contour line and a third pixel point inside the contour line; determining, for a second region adjacent to the first region in the plurality of regions, second adjustment parameters of a plurality of reference pixel points in the second region, wherein the plurality of reference pixel points comprises a second pixel point on the contour line and a fourth pixel point inside the contour line; and adjusting the image to be processed according to the first adjustment parameters and the second adjustment parameters to determine an adjusted image.

The other features and aspects of the present disclosure can be described more clearly according to the detailed descriptions of the exemplary embodiments in the accompanying drawings.

BRIEF DESCRIPTION OF THE DRAWINGS

The accompanying drawings included in the specification and constituting a part of the specification illustrate the exemplary embodiments, features, and aspects of the present disclosure together with the specification, and are used for explaining the principles of the present disclosure.

DETAILED DESCRIPTION

The various exemplary embodiments, features, and aspects of the present disclosure are described below in detail with reference to the accompanying drawings. The same signs in the accompanying drawings represent elements having the same or similar functions. Although the various aspects of the embodiments are illustrated in the accompanying drawings, unless stated particularly, it is not required to draw the accompanying drawings in proportion.

The special word "exemplary" here means "used as examples, embodiments, or descriptions". Any "exemplary" embodiment given here is not necessarily construed as being superior to or better than other embodiments.

In addition, numerous details are given in the following detailed description for the purpose of better explaining the present disclosure. It should be understood by persons skilled in the art that the present disclosure can still be implemented even without some of those details. In some of the examples, methods, means, elements, and circuits that are well known to persons skilled in the art are not described in detail so that the principle of the present disclosure becomes apparent.

Figure 1:
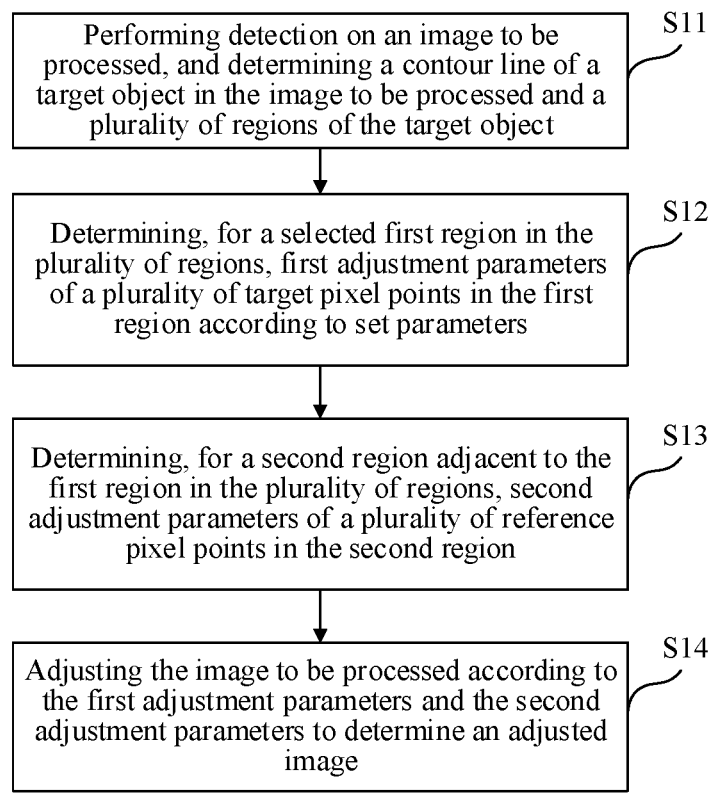
FIG. 1 is a flowchart of an image processing method according to an embodiment of the present disclosure.

FIG. 1 is a flowchart of an image processing method according to an embodiment of the present disclosure. As shown in FIG. 1, the method may include:

step S11, inspection is performed on an image to be processed, and a contour line of a target object in the image to be processed and a plurality of regions of the target object are determined;

step S12, for a selected first region in the plurality of regions, first adjustment parameters of a plurality of target pixel points in the first region are determined according to set parameters, where the plurality of target pixel points includes a first pixel point on the contour line and a third pixel point inside the contour line;

step S13, for a second region adjacent to the first region in the plurality of regions, second adjustment parameters of a plurality of reference pixel points in the second region are determined, where the plurality of reference pixel points includes a second pixel point on the contour line and a fourth pixel point inside the contour line; and step S14, the image to be processed are adjusted according to the first adjustment parameters and the second adjustment parameters to determine an adjusted image.

According to the image processing methods provided by the embodiments of the present disclosure, second adjustment parameters of reference pixel points in a second region adjacent to a selected first region is determined by means of first adjustment parameters of target pixel points in the first region, and the image to be processed is determined by means of the first adjustment parameters and the second adjustment parameters, so that the second region can be adaptively adjusted when the first region is adjusted, and thus, the contour line of the target object in the image to be processed is smooth after the adjustment, and the contour lines of the first region and the second region are smoothly connected, thereby preventing distortion from occurring in the second region when the first region is adjusted, and achieving a good visual effect.

In a possible implementation, the image processing method may be performed by a terminal device. The terminal device may be a User Equipment (UE), a mobile device, a user terminal, a terminal, a cellular phone, a cordless phone, a Personal Digital Assistant (PDA), a handheld device, a computing device, a vehicle-mounted device, a wearable device, or the like. The method may be implemented by a processor by invoking computer-readable instructions stored in a memory. Alternatively, an image to be processed may be acquired by a terminal device or an image acquisition device (e.g., a camera or the like), and the image to be processed is transmitted to a server, so as to execute the method by the server.

In a possible implementation, the image to be processed may include a picture, or a video frame in a video stream, or the like. The target object may include an object such as a person, an animal, or a thing in the image. In step S11, the contour line of the target object may be recognized by a deep learning-based image recognition method or edge detection or other methods, and a plurality of regions of the target object may be determined according to an attribute such as the shape of the target object. For example, if the target object is a person, inspection may be performed on the image to be processed to recognize a contour line of the person in the image to be processed, and a head region, an arm region, a chest region, a waist region, and a leg region of the person are determined.

In a possible implementation, in step S12, one or more regions may be selected from the above regions as the first region for adjustment. Target pixel points in the first region may be adjusted according to the set parameters by an image adjustment method such as local translation warps. For example, parameters such as adjustment directions and adjustment amplitudes of the target pixel points may be determined by means of set first adjustment parameters of the first region, and the target pixel points in the first region are adjusted by means of local translation warps based on the parameters such as the adjustment direction and the adjustment amplitude. All first pixel points on the contour line of the first region may be adjusted (i.e., the contour line of the first region is adjusted), and a third pixel point inside the contour line is adjusted. One or more pixel points on the contour line may also be selected as a first pixel point, inside the contour line, several third pixel points may be selected within a preset range around the first pixel point, and the first pixel point and the third pixel points are adjusted.

In an example, a waist region may be selected for adjustment, that is, the waist region is used as the first region, and the adjustment may include adjusting a first pixel point on a contour line of the waist region and a third pixel point inside the contour line of the waist region, for example, the first pixel point on the contour line of the waist region may be adjusted toward the inner side of the contour line, and the third pixel point is adaptively adjusted, to produce a waist shaping effect.

In an example, a leg region may be selected for adjustment, that is, the leg region is used as the first region, and the adjustment may include adjusting a first pixel point on an outer contour line of the leg and a first pixel point on an inner contour line of the leg, and adjusting a third pixel point inside a contour line between the inner contour line and the outer contour line. For example, the first pixel point on the outer contour line of the leg may be adjusted toward the inner contour line and a third pixel point near the outer contour line is adaptively adjusted, and meanwhile, the first pixel point on the inner contour line of the leg may also be adjusted toward the outer contour line and a third pixel point near the inner contour line may be adaptively adjusted, to produce a leg shaping effect. The adjustment amplitude of the first pixel point on the outer contour line may be greater than the adjustment amplitude of the first pixel point on the inner contour line.

In a possible implementation, the first adjustment parameters may include a first adjustment direction and a first adjustment amplitude of the first pixel point, and the second adjustment parameters may include a second adjustment direction and a second adjustment amplitude of the second pixel point. The first adjustment direction is an adjustment direction of the first pixel point when the first pixel point is adjusted, the first adjustment amplitude is an adjustment amplitude of the first pixel point when the first pixel point is adjusted, and the adjustment amplitude may be represented by a distance to be moved. In an example, in the image to be processed, the adjustment amplitude may be represented by the number of pixels to be moved, for example, adjustment to the left by a distance of 10 pixels. Similarly, the second adjustment direction is an adjustment direction of the second pixel point when the second pixel point is adjusted, and the second adjustment amplitude is an adjustment amplitude of the second pixel point when the second pixel point is adjusted.

Figure 2:
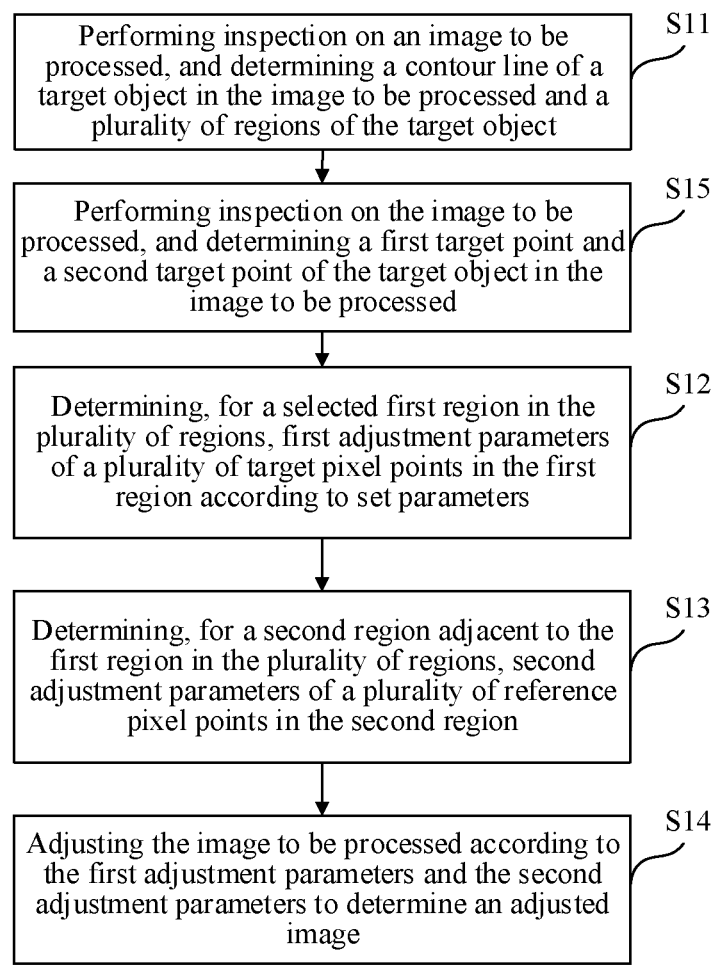
FIG. 2 is a flowchart of an image processing method according to an embodiment of the present disclosure.

FIG. 2 is a flowchart of an image processing method according to an embodiment of the present disclosure. As shown in FIG. 2, in a possible implementation, the method may further include:

step S15, inspection is performed on the image to be processed, and a first target point and a second target point of the target object in the image to be processed are determined, where the first target point and the second target point are located inside or on the contour line, the first target point corresponds to the first pixel point, and the second target point corresponds to the second pixel point.

The first adjustment direction includes a direction coming close to or moving away from the first target point, and the second adjustment direction includes a direction coming close to or moving away from the second target point.

In a possible implementation, in step S15, a first target point and a second target point may be determined in the image to be processed. The first target point corresponds to the first pixel point. When the first pixel point is adjusted, the first pixel point targets the first target point and may get close to or away from the first target point. The second target point corresponds to the second pixel point. When the second pixel point is adjusted, the second pixel point targets the second target point and may get close to or away from the second target point.

In a possible implementation, the first target point and the second target point are inside the contour line. In an example, the first region is a waist region, contour line detection may be performed on the waist region to determine two contour lines of the waist region, and first pixel points on the two contour lines are determined. Further, one or more first pixel points are on each of the two contour lines, and an intermediate point, in the horizontal direction, of two first pixel points having the same height in the vertical direction on the two contour lines is used as a first target point. For example, if a left contour line and a right contour line are detected for the waist region in the image to be processed, the first target point may be located in a region between the left contour line and the right contour line. There is a first pixel point having a vertical height of 200 pixels on the left contour line, and there is also a first pixel point having a vertical height of 200 pixels on the right contour line. The distance between the two pixel points in the horizontal direction is 200 pixels. The midpoint of a connection line between the two first pixel points in the horizontal direction may be selected as a first target point. That is, a pixel point having a distance of 100 pixels from the first pixel point on the left or right contour line is used as the first target point.

In an example, the first region is a chest region, and an intermediate point, in the horizontal direction, of two first pixel points having the same height in the vertical direction on two contour lines of the chest region may be used as a first target point. In an example, the first region is a leg region, and when a first pixel point on an outer contour line of the leg is adjusted, a first pixel point on an inner contour line thereof having the same height in the vertical direction as the first pixel point on the outer contour line may be used as a first target point; when a first pixel point on the inner contour line of the leg is adjusted, a first pixel point on the outer contour line having the same height in the vertical direction as the first pixel point on the inner contour line may be used as a first target point. The present disclosure does not limit the method for selecting a first target point.

In a possible implementation, the method for selecting a first target point may also be used as a method for selecting a second target point. In an example, the first region is a waist region and the second region is a chest region, when selecting a first target point, an intermediate point, in the horizontal direction, of two first pixel points having the same height in the vertical direction on two contour lines of the waist is used as the first target point, and an intermediate point, in the horizontal direction, of two first pixel points having the same height in the vertical direction on two contour lines of the chest region is used as a second target point.

In a possible implementation, in step S12, the first adjustment parameters may include a first adjustment direction and a first adjustment amplitude of the first pixel point. The first adjustment direction and the first adjustment amplitude may be adjustment parameters determined according to set parameters. For example, the first region is a leg region, and a leg shaping effect may be achieved by adjusting target pixel points in the leg region. The adjustment amplitude of a first pixel point on an outer contour line of the leg region may be set as adjustment by a distance of 20 pixels, and the adjustment direction may be set as a direction coming close to a first target point; the adjustment amplitude of a first pixel point on an inner contour line of the leg region may be set as adjustment by a distance of 10 pixels, and the adjustment direction may be set as a direction coming close to a first target point.

Figure 3:
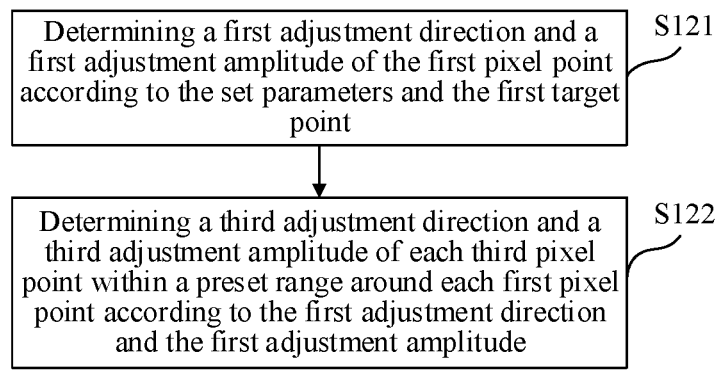
FIG. 3 is a flowchart of step S12 of an image processing method according to an embodiment of the present disclosure.

FIG. 3 is a flowchart of step S12 of an image processing method according to an embodiment of the present disclosure. As shown in FIG. 3, the first adjustment parameters further include a third adjustment direction and a third adjustment amplitude of the third pixel point. Step S12 may include:

step S121, the first adjustment direction and the first adjustment amplitude of the first pixel point are determined according to the set parameters and the first target point; and step S122, a third adjustment direction and a third adjustment amplitude of each third pixel point within a preset range around each first pixel point are determined according to the first adjustment direction and the first adjustment amplitude.

In a possible implementation, in step S121, the first adjustment direction and the first adjustment amplitude may be determined according to the set parameters and the first target point. In an example, when the selected first region is adjusted, the first pixel point may be adjusted according to the set parameters and the first target point. For example, the first region is a waist, and in order to produce a waist shaping effect, the first adjustment amplitude of the first pixel point may be determined as adjustment by a distance of 20 pixels, and the first adjustment direction is determined as a direction coming close to the first target point.

In a possible implementation, in step S122, a third adjustment amplitude of each third pixel point within a preset range around the first pixel point may be determined according to the first adjustment amplitude. In an example, the preset range around the first pixel point is a portion, inside the contour line, of a circular region that is centered on the first pixel point and has a radius being the distance between the first pixel point and the first target point. The adjustment amplitude of the third pixel point may be related to the distance between the first pixel point and the third pixel point. The third adjustment amplitude of the third pixel point is smaller than the first adjustment amplitude, and the third adjustment amplitude of the third pixel point is negatively correlated with a second reference distance, where the second reference distance is the distance between the third pixel point and the first pixel point. That is, the greater the distance between the third pixel point and the first pixel point, the smaller the third adjustment amplitude of the third pixel point.

In an example, according to the adjustment amplitude of a certain first pixel point, the adjustment amplitude of each third pixel point within a preset range around the first pixel point may be determined, that is, a third pixel point having a greater distance from the first pixel point within the preset range around the first pixel point has a smaller adjustment amplitude. For example, if the first adjustment amplitude of the first pixel point is adjustment by a distance of 15 pixels, the adjustment amplitude of a third pixel point having a distance of 10 pixels from the first pixel point is adjustment by a distance of 10 pixels, the adjustment amplitude of a third pixel point having a distance of 20 pixels from the first pixel point is adjustment by a distance of 5 pixels, or the like. The present disclosure does not limit the adjustment amplitude.

Figure 4:
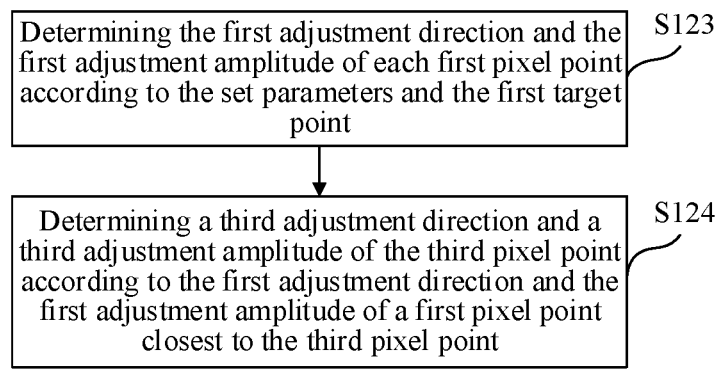
FIG. 4 is a flowchart of step S12 of an image processing method according to an embodiment of the present disclosure.

FIG. 4 is a flowchart of step S12 of an image processing method according to an embodiment of the present disclosure. As shown in FIG. 4, the first adjustment parameters further include a third adjustment direction and a third adjustment amplitude of the third pixel point. Step S12 may include:

step S123, the first adjustment direction and the first adjustment amplitude of each first pixel point are determined according to the set parameters and the first target point; and step S124, the third adjustment direction and the third adjustment amplitude of the third pixel point are determined according to the first adjustment direction and the first adjustment amplitude of a first pixel point closest to the third pixel point.

In a possible implementation, in step S123, the first adjustment direction and the first adjustment amplitude may be determined according to the set parameters and the first target point. In an example, when the selected first region is adjusted, the first pixel point may be adjusted according to the set parameters and the first target point. For example, the first region is a waist, and in order to produce a waist shaping effect, the first adjustment amplitude of the first pixel point may be determined as adjustment by a distance of 20 pixels, and the first adjustment direction may be determined as a direction coming close to the first target point.

In a possible implementation, in step S124, the third adjustment amplitude of the third pixel point may be determined according to the first adjustment amplitude of a first pixel point that is closest to the third pixel point. In an example, if the distance between the third pixel point and the closest first pixel point is 10 pixels, the third adjustment amplitude and the third adjustment direction of the third pixel point may be determined only according to the first adjustment amplitude of the first pixel point. The third adjustment amplitude of the third pixel point is smaller than the first adjustment amplitude, and the third adjustment amplitude of the third pixel point is negatively correlated with a second reference distance, where the second reference distance is a distance between the third pixel point and the first pixel point. That is, the greater the distance between the third pixel point and the first pixel point, the smaller the third adjustment amplitude of the third pixel point.

Figure 5:
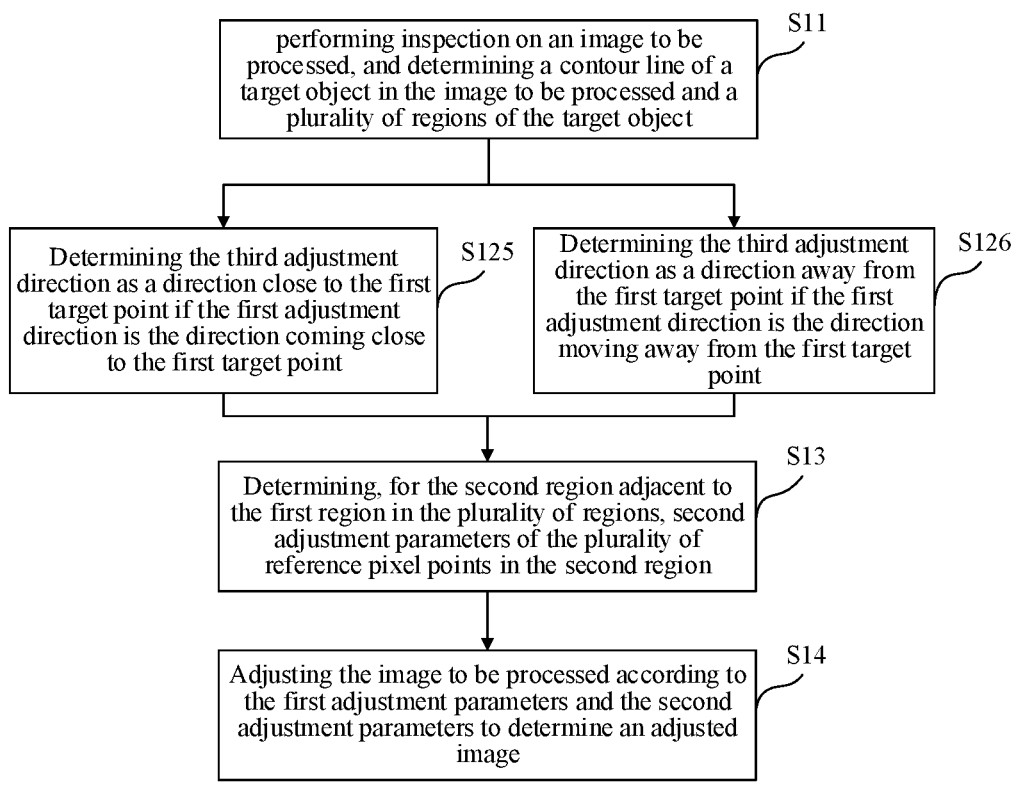
FIG. 5 is a flowchart of an image processing method according to an embodiment of the present disclosure.

FIG. 5 is a flowchart of an image processing method according to an embodiment of the present disclosure. As shown in FIG. 5, the first adjustment parameters further include a third adjustment direction and a third adjustment amplitude of the third pixel point, and step S12 may include one of:

step S125, the third adjustment direction is determined as a direction coming close to the first target point if the first adjustment direction is the direction coming close to the first target point; and step S126, the third adjustment direction is determined as a direction moving away from the first target point if the first adjustment direction is the direction moving away from the first target point.

In a possible implementation, the third adjustment direction may be determined according to step S125 or step S126, and the third adjustment amplitude may be determined according to step S122 or step S124. In an example, the first pixel point is one or more first pixel points selected on the contour line of the first region, and the third adjustment direction and the third adjustment amplitude of each third pixel point within a preset range around the first pixel point may be determined according to the adjustment direction and the adjustment amplitude of the first pixel point. If a certain third pixel point is simultaneously within preset ranges around two or more first pixel points, the adjustment direction and the adjustment amplitude of the third pixel point are vector sums of third adjustment directions and third adjustment amplitudes respectively determined according to the first adjustment directions and the first adjustment amplitudes of the two or more first pixel points. In an example, the adjustment of a pixel point may be determined according to a vector operation rule, the third adjustment direction is the direction of a vector, the third adjustment amplitude is the size of the vector, and vector addition may be performed based on a plurality of third adjustment directions and third adjustment amplitudes determined according to the first adjustment directions and the first adjustment amplitudes of the plurality of first pixel points to determine the final adjustment direction and adjustment amplitude of the third pixel point, respectively. When the first adjustment amplitude and the first adjustment direction of the first pixel point and the third adjustment amplitude and the third adjustment direction of the third pixel point are all determined, the target pixel points in the first region may be adjusted according to these first adjustment parameters.

In an example, the first region is a waist region, and a first adjustment amplitude and a first adjustment direction of a first pixel point on a contour line of the waist region may be determined according to set parameters. For example, the first adjustment amplitude is adjustment by a distance of 20 pixels, and the first adjustment direction is a direction coming close to a first target point, to produce a waist shaping effect. In third pixel points inside the contour line, for example, if a certain third pixel point is within preset ranges around two first pixel points, and the distance between the third pixel point and one of the first pixel points is 10 pixels, according to the distance and the first adjustment amplitude and the first adjustment direction of the first pixel point, it may be determined that the third adjustment amplitude of the third pixel point is adjustment by a distance of 10 pixels, and the third adjustment direction is a direction coming close to a first target point corresponding to the first pixel point. Further, if the distance between the third pixel point and the other first pixel point is 20 pixels, according to the distance and the first adjustment amplitude and the first adjustment direction of the other first pixel point, it may be determined that the third adjustment amplitude of the third pixel point is adjustment by a distance of 5 pixels, and the third adjustment direction is a direction coming close to a first target point corresponding to the other first pixel point. The final adjustment amplitude and adjustment direction of the third pixel point may be determined according to a vector operation rule, that is, vector sums composed of vectors respectively corresponding to the two third adjustment directions and the two third adjustment amplitudes are calculated.

In a possible implementation, the third adjustment amplitude and the third adjustment direction of the third pixel point may be determined only according to the closest first pixel point. In an example, if the distance between the third pixel point and the closest first pixel point is 10 pixels, the third adjustment amplitude and the third adjustment direction of the third pixel point may be determined only according to the first adjustment amplitude and the first adjustment direction of the first pixel point. For example, if the first adjustment amplitude of the first pixel point is adjustment by a distance of 15 pixels and the first adjustment direction is a direction coming close to a first target point corresponding to the first pixel point, the third adjustment amplitude of the third pixel point is adjustment by a distance of 10 pixels and the third adjustment direction is a direction coming close to the first target point corresponding to the first pixel point.

In this way, the third pixel point inside the contour line of the first region may be adjusted when the target pixel points in the first region are adjusted, and the adjustment direction of the third pixel point inside the contour line is adapted to the adjustment direction of the first pixel point on the contour line, thereby achieving overall adjustment of the region inside the contour line, and preventing distortion from occurring in the first region of the image to be processed, and thus, the region inside the contour line of the image may be more naturally adjusted.

In a possible implementation, in step S13, the second adjustment parameters of the reference pixel points in the second region may be determined according to the first adjustment parameters of the target pixel points in the first region. The first region is a selected region to be adjusted. In the region to be adjusted, the first adjustment direction and the first adjustment amplitude of the first pixel point may be set, and the third pixel point is adaptively adjusted. Further, when the target pixel points in the first region are adjusted, the second region adjacent to the first region may also be adaptively adjusted to smooth the contour line of the target object. For example, the first region is a leg region and the second region is a waist region. When the leg region is adjusted to produce a leg shaping effect, the waist region may be adaptively adjusted to make the contour line of the waist region and the outer contour line of the leg region smoothly transition, thereby avoiding image distortion.

Figure 6:
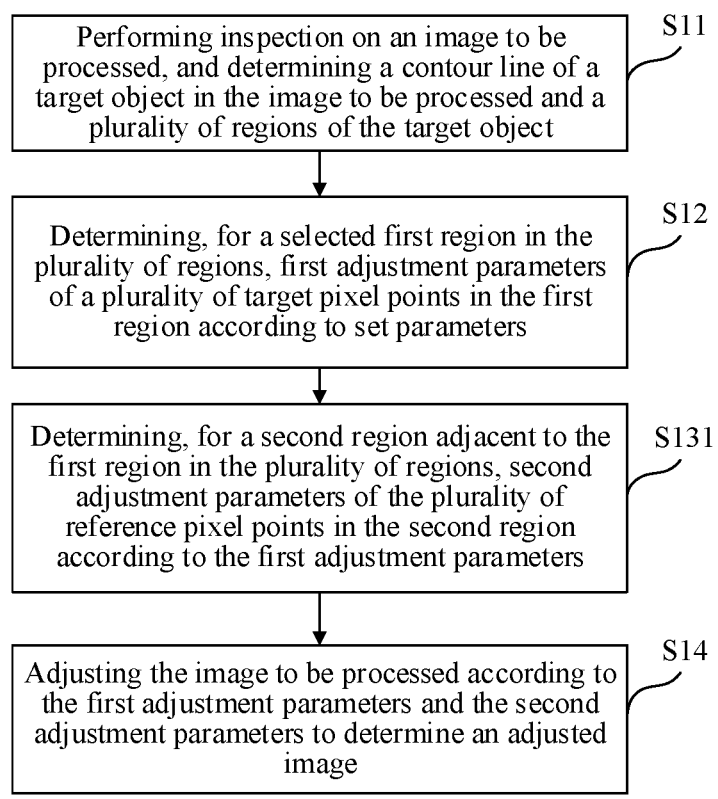
FIG. 6 is a flowchart of an image processing method according to an embodiment of the present disclosure.

FIG. 6 is a flowchart of an image processing method according to an embodiment of the present disclosure. As shown in FIG. 6, step S13 may include:

step S131, for the second region adjacent to the first region in the plurality of regions, second adjustment parameters of the plurality of reference pixel points in the second region are determined according to the first adjustment parameters.

In a possible implementation, in the second region, the second adjustment parameters of the second pixel point on the contour line and the fourth pixel point inside the contour line may be determined according to the first adjustment parameters. For example, the second adjustment amplitude and the second adjustment direction of the second pixel point and the fourth adjustment amplitude and the fourth adjustment direction of the fourth pixel point may be determined according to the first adjustment parameters.

In a possible implementation, the second region may include a plurality of reference pixel points, and the reference pixel points may include the second pixel point on the contour line and the fourth pixel point inside the contour line in the second region. When the target pixel points in the first region is adjusted, the second pixel point may be adaptively adjusted to smooth the contour line, and when the second pixel point is adjusted, the fourth pixel point may be adjusted at the same time to avoid image distortion of the second region.

Figure 7:
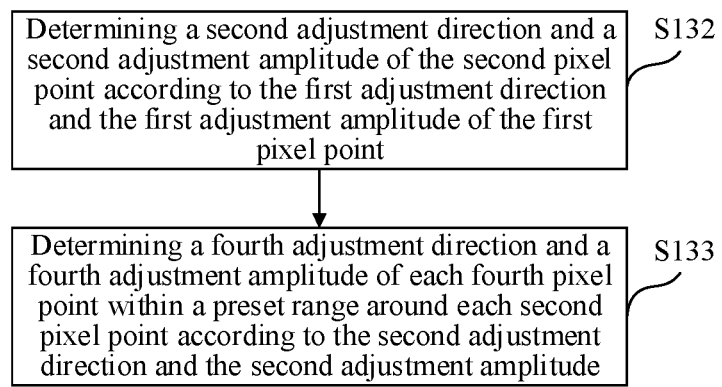
FIG. 7 is a flowchart of step S13 of an image processing method according to an embodiment of the present disclosure.

FIG. 7 is a flowchart of step S13 of an image processing method according to an embodiment of the present disclosure. As shown in FIG. 7, the second adjustment parameters further include a fourth adjustment direction and a fourth adjustment amplitude of the fourth pixel point, and step S13 may include:

step S132, the second adjustment direction and the second adjustment amplitude of the second pixel point are determined according to the first adjustment direction and the first adjustment amplitude of the first pixel point; and step S133, the fourth adjustment direction and the fourth adjustment amplitude of each fourth pixel point within a preset range around each second pixel point are determined according to the second adjustment direction and the second adjustment amplitude.

In a possible implementation, in step S132, the second adjustment amplitude of the second pixel point may be determined according to the first adjustment amplitude of the first pixel point. The adjustment amplitude of the second pixel point may be related to the minimum distance between the second pixel point and the first region. The second adjustment amplitude of the second pixel point is smaller than the first adjustment amplitude, and the second adjustment amplitude of the second pixel point is negatively correlated with a first reference distance, where the first reference distance is the minimum distance between the second pixel point and the first region. That is, the greater the minimum distance between the second pixel point and the first region, the smaller the adjustment amplitude of the second pixel point. For example, if the first adjustment amplitude of the first pixel point is adjustment by a distance of 20 pixels, the adjustment amplitude of a second pixel point having a minimum distance of 20 pixels from the first region is adjustment by a distance of 10 pixels, the adjustment amplitude of a second pixel point having a minimum distance of 30 pixels from the first region is adjustment by a distance of 5 pixels, or the like. The present disclosure does not limit the adjustment amplitude.

In an example, the minimum distance between the second pixel point and the first region is the minimum distance between the second pixel point and the boundary between the first region and the second region. For example, the first region is a leg region, and the second region is a waist region. The boundary between the first region and the second region may be a waist line in the image to be processed, and the first reference distance may be the minimum distance between the second pixel point and the waist line. For example, if the waist line in the image to be processed is a straight line, the length of a vertical from the second pixel point to the straight line is the first reference distance, and if the waist line is a curve, the minimum distance from the second pixel point to the curve is the first reference distance.

In a possible implementation, in step S133, the fourth adjustment amplitude of each fourth pixel point within the preset range around may be determined according to the second adjustment amplitude of the second pixel point. In an example, the preset range around the second pixel point is a portion, inside the contour line, of a circular region that is centered on the second pixel point and has a radius being the distance between the second pixel point and the second target point. The fourth adjustment amplitude may be related to the distance between the fourth pixel point and the second pixel point. The fourth adjustment amplitude of the fourth pixel point is smaller than the second adjustment amplitude of the second pixel point, and the fourth adjustment amplitude of the fourth pixel point is negatively correlated with a third reference distance, where the third reference distance is a distance between the fourth pixel point and the second pixel point. That is, the greater the distance between the fourth pixel point and the second pixel point, the smaller the fourth adjustment amplitude of the fourth pixel point. For example, if the second adjustment amplitude of the second pixel point is adjustment by a distance of 10 pixels, the fourth adjustment amplitude of a fourth pixel point having a distance of 10 pixels from the second pixel point is adjustment by a distance of 5 pixels, the adjustment amplitude of a fourth pixel point having a distance of 20 pixels from the second pixel point is adjustment by a distance of 2 pixels, or the like. The present disclosure does not limit the adjustment amplitude.

In an example, according to the adjustment amplitude of a certain second pixel point, the adjustment amplitude of each fourth pixel point within a preset range around the second pixel point may be determined, that is, a fourth pixel point having a greater distance from the second pixel point within the preset range around the second pixel point has a smaller adjustment amplitude.

Figure 8:
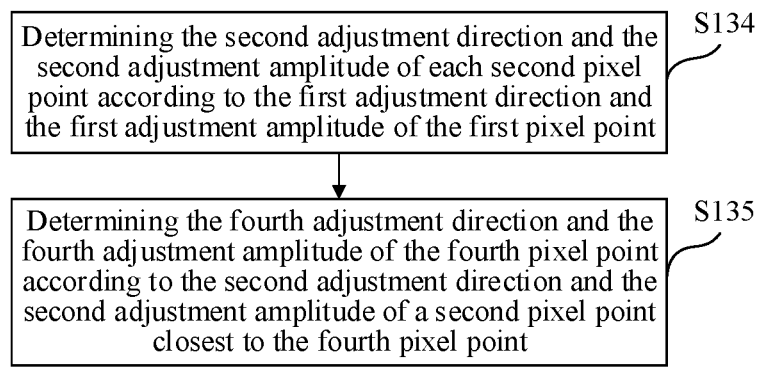
FIG. 8 is a flowchart of step S13 of an image processing method according to an embodiment of the present disclosure.

FIG. 8 is a flowchart of step S13 of an image processing method according to an embodiment of the present disclosure. As shown in FIG. 8, the second adjustment parameters further include a fourth adjustment direction and a fourth adjustment amplitude of the fourth pixel point, and step S13 may include:

step S134, the second adjustment direction and the second adjustment amplitude of each second pixel point are determined according to the first adjustment direction and the first adjustment amplitude of the first pixel point; and step S135, the fourth adjustment direction and the fourth adjustment amplitude of the fourth pixel point are determined according to the second adjustment direction and the second adjustment amplitude of a second pixel point closest to the fourth pixel point.

In a possible implementation, in step S134, the second adjustment amplitude of the second pixel point may be determined according to the first adjustment amplitude of the first pixel point. The adjustment amplitude of the second pixel point may be related to the minimum distance between the second pixel point and the first region. The second adjustment amplitude of the second pixel point is smaller than the first adjustment amplitude, and the second adjustment amplitude of the second pixel point is negatively correlated with a first reference distance, where the first reference distance is the minimum distance between the second pixel point and the first region. That is, the greater the minimum distance between the second pixel point and the first region, the smaller the adjustment amplitude of the second pixel point. The present disclosure does not limit the adjustment amplitude.

In a possible implementation, in step S135, the fourth adjustment amplitude of the fourth pixel point may be determined according to the second adjustment amplitude of a second pixel point that is closest to the fourth pixel point. In an example, if the distance between the fourth pixel point and the closest second pixel point is 10 pixels, the fourth adjustment amplitude and the fourth adjustment direction of the fourth pixel point may be determined only according to the second adjustment amplitude of the second pixel point. The fourth adjustment amplitude of the fourth pixel point is smaller than the second adjustment amplitude, and the fourth adjustment amplitude of the fourth pixel point is negatively correlated with a third reference distance, where the third reference distance is a distance between the fourth pixel point and the second pixel point. That is, the greater the distance between the fourth pixel point and the second pixel point, the smaller the fourth adjustment amplitude of the fourth pixel point.

Figure 9:
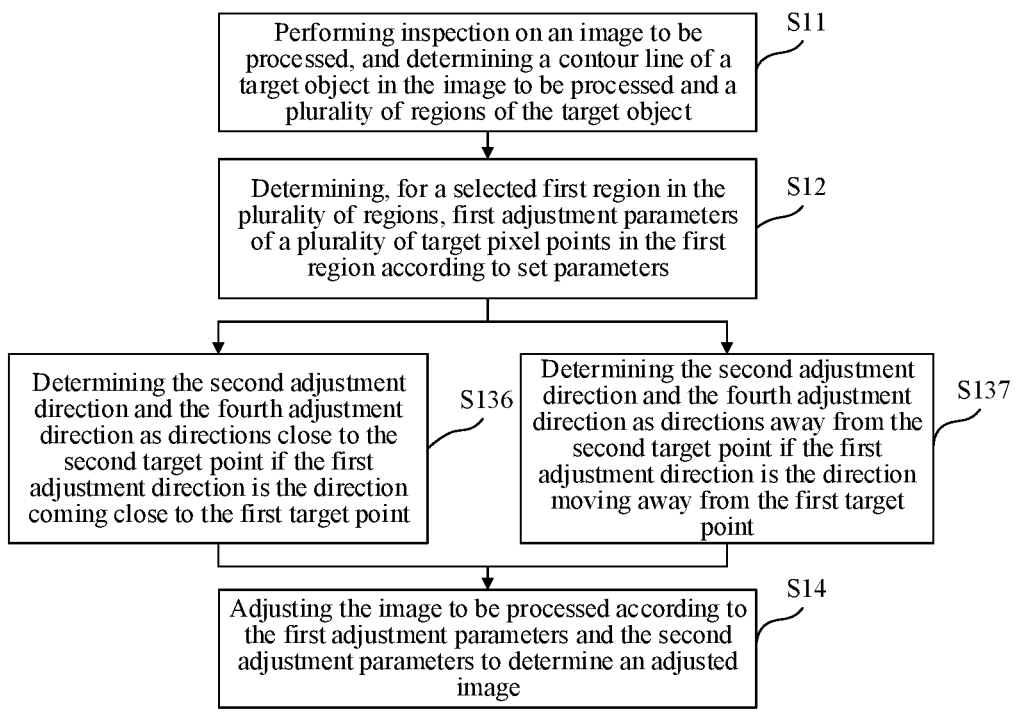
FIG. 9 is a flowchart of an image processing method according to an embodiment of the present disclosure.

FIG. 9 is a flowchart of an image processing method according to an embodiment of the present disclosure. As shown in FIG. 9, the second adjustment parameters further include a fourth adjustment direction and a fourth adjustment amplitude of the fourth pixel point, and step S13 may include one of:

step S136, the second adjustment direction and the fourth adjustment direction are determined as directions close to the second target point if the first adjustment direction is the direction coming close to the first target point; and step S137, the second adjustment direction and the fourth adjustment direction are determined as directions moving away from the second target point if the first adjustment direction is the direction moving away from the first target point.

In a possible implementation, the second adjustment direction of the second pixel point may be determined according to step S136 or step S137, and the second adjustment amplitude may be determined according to step S132 or step S134. The fourth adjustment direction of the fourth pixel point may be determined according to step S136 or step S137, and the fourth adjustment amplitude may be determined according to step S133 or step S135. That is, if the first adjustment direction is the direction coming close to the first target point, the second adjustment direction is a direction coming close to the second target point, and the fourth adjustment direction of the fourth pixel point within the preset range around the second pixel point may also be determined as a direction coming close to the second target point according to the adjustment direction of the second pixel point. If the first adjustment direction is the direction moving away from the first target point, the second adjustment direction is a direction moving away from the second target point, and the fourth adjustment direction of the fourth pixel point within the preset range around the second pixel point may also be determined as a direction moving away from the second target point according to the adjustment direction of the second pixel point.

In a possible implementation, if a certain fourth pixel point is simultaneously within preset ranges around two or more second pixel points, the adjustment direction and the adjustment amplitude of the fourth pixel point are vector sums of fourth adjustment directions and fourth adjustment amplitudes respectively determined according to the second adjustment directions and the second adjustment amplitudes of the two or more second pixel points. In an example, the adjustment of a pixel point may be determined according to a vector operation rule, the fourth adjustment direction is the direction of a vector, the fourth adjustment amplitude is the size of the vector, and vector addition may be performed based on a plurality of fourth adjustment directions and fourth adjustment amplitudes determined according to the second adjustment directions and the second adjustment amplitudes of the plurality of second pixel points to determine the final adjustment direction and adjustment amplitude of the fourth pixel point, respectively. When the second adjustment amplitude and the second adjustment direction of the second pixel point and the fourth adjustment amplitude and the fourth adjustment direction of the fourth pixel point are all determined, the target pixel points in the second region may be adjusted according to these second adjustment parameters.

In an example, the first region is a leg region. The leg region may be selected for adjustment to produce a leg shaping effect, and a waist region (the second region) may be adaptively adjusted at the same time. A second adjustment amplitude and a second adjustment direction of a second pixel point on a contour line of the waist region may be determined according to the first adjustment parameters and the minimum distance between the second pixel point and the first region. For example, the second adjustment amplitude of a second pixel point having a minimum distance of 20 pixels from the first region is adjustment by a distance of 10 pixels, and the adjustment direction is a direction coming close to a second target point corresponding to the second pixel point. The second adjustment amplitude of a second pixel point having a minimum distance of 30 pixels from the first region is adjustment by a distance of 5 pixels, and the adjustment direction is a direction coming close to a second target point corresponding to the second pixel point. In fourth pixel points inside the contour line, for example, if a certain fourth pixel point is within preset ranges around the two second pixel points above, and the distance between the fourth pixel point and the second pixel point with an adjustment amplitude being adjustment by a distance of 10 pixels is 10 pixels, according to the distance and the second adjustment amplitude and the second adjustment direction of the second pixel point, it may be determined that the fourth adjustment amplitude of the fourth pixel point is adjustment by a distance of 5 pixels, and the fourth adjustment direction is a direction coming close to a second target point corresponding to the second pixel point. Further, if the distance between the fourth pixel point and the other second pixel point with an adjustment amplitude being adjustment by a distance of 5 pixels is 20 pixels, according to the distance and the second adjustment amplitude and the second adjustment direction of the other second pixel point, it may be determined that the fourth adjustment amplitude of the fourth pixel point is adjustment by a distance of 2 pixels, and the fourth adjustment direction is a direction coming close to a second target point corresponding to the other second pixel point. The final adjustment amplitude and adjustment direction of the fourth pixel point may be determined according to a vector operation rule, that is, vector sums composed of vectors respectively corresponding to the two fourth adjustment directions and the two fourth adjustment amplitudes are calculated.

In a possible implementation, the fourth adjustment amplitude and the fourth adjustment direction of the fourth pixel point may be determined only according to the closest second pixel point. In an example, if the distance between the fourth pixel point and the closest second pixel point is 10 pixels, the fourth adjustment amplitude and the fourth adjustment direction of the fourth pixel point may be determined only according to the second adjustment amplitude and the second adjustment direction of the second pixel point. For example, if the second adjustment amplitude of the second pixel point is adjustment by a distance of 10 pixels and the second adjustment direction is a direction coming close to a second target point corresponding to the second pixel point, the fourth adjustment amplitude of the fourth pixel point is adjustment by a distance of 5 pixels and the fourth adjustment direction is a direction coming close to the second target point corresponding to the second pixel point.

In this way, the reference pixel points in the second region adjacent to the first region may be adaptively adjusted when the target pixel points in the first region are adjusted, so as to smooth the contour line of the target object; at the same time, the fourth pixel point inside the contour line of the second region is adjusted, and the adjustment direction of the fourth pixel point inside the contour line is adapted to the adjustment direction of the second pixel point on the contour line, thereby achieving overall adjustment of the region inside the contour line, and preventing distortion from occurring in the second region of the image to be processed, and thus, the region inside the contour line of the image may be more naturally adjusted.

In a possible implementation, in step S14, the image to be processed may be adjusted according to the first adjustment parameters and the second adjustment parameters to obtain an adjusted image. The adjusted image may be an image having a waist shaping or leg shaping effect, or the like.

According to the image processing methods provided by the embodiments of the present disclosure, second adjustment parameters of reference pixel points in a second region adjacent to a selected first region is determined by means of first adjustment parameters of target pixel points in the first region, and the image to be processed is determined by means of the first adjustment parameters and the second adjustment parameters, so that the second region can be adaptively adjusted when the first region is adjusted, and thus, the contour line of the target object in the image to be processed is smooth after the adjustment, and the contour lines of the first region and the second region are smoothly connected, thereby preventing distortion from occurring in the second region when the first region is adjusted, and achieving a good visual effect. In addition, the third pixel point and the fourth pixel point inside the contour line may also be adaptively adjusted according to the first adjustment direction and the first adjustment amplitude of the first pixel point and the second adjustment direction and the second adjustment amplitude of the second pixel point, thereby achieving overall adjustment of the region inside the contour line, and avoiding distortion of the adjusted image, and thus, the region inside the contour line of the image may be more naturally adjusted.

Figure 10:
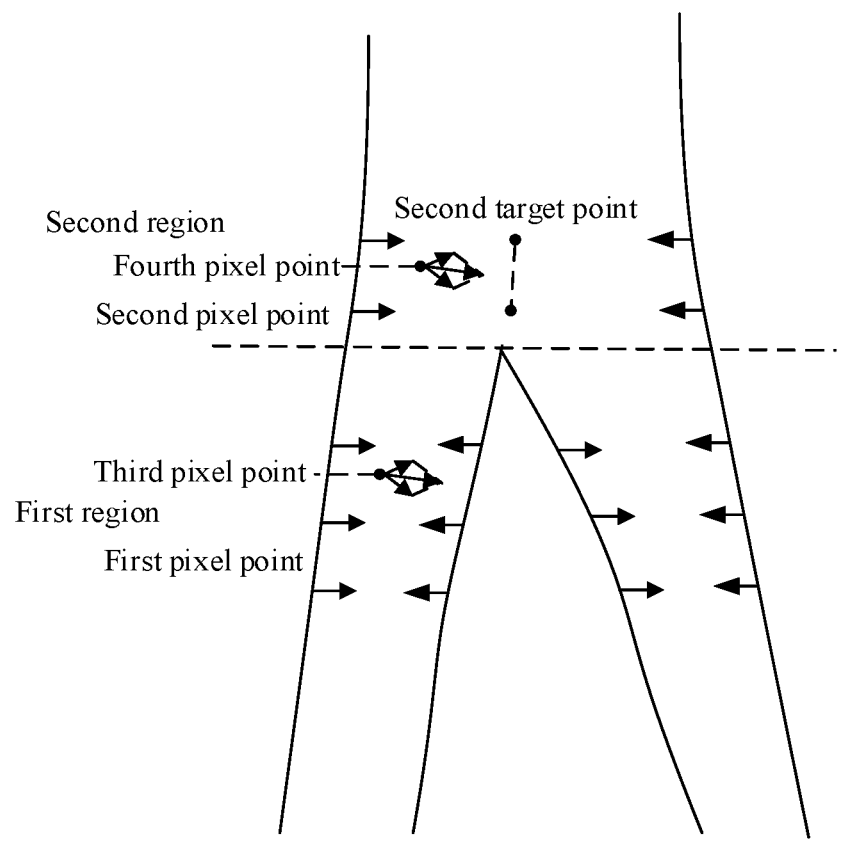
FIG. 10 is a schematic diagram of an application of an image processing method according to an embodiment of the present disclosure.

FIG. 10 is a schematic diagram of an application of an image processing method according to an embodiment of the present disclosure. As shown in FIG. 10, the selected first region is a leg region. It may be determined according to the set parameters that the first adjustment amplitude of a first pixel point on an outer contour line of the leg is adjustment by a distance of 20 pixels, and the adjustment direction of the first pixel point on the outer contour line is a direction coming close to its corresponding first target point, where the first target point of the first pixel point on the outer contour line is a first pixel point on an inner contour line having the same height as the first pixel point on the outer contour line in the vertical direction. The inner contour line of the leg region is adjusted while adjusting the outer contour line of the leg region to avoid image distortion. For example, the first adjustment amplitude of a first pixel point on the inner contour line is set as adjustment by a distance of 5 pixels, and the adjustment direction of the first pixel point on the inner contour line is a direction coming close to its corresponding first target point, where the first target point of the first pixel point on the inner contour line is a first pixel point on the outer contour line having the same height as the first pixel point on the inner contour line in the vertical direction.

In a possible implementation, when the first pixel point is adjusted, a third pixel point within a preset range around the first pixel point may be adjusted. The third adjustment amplitude of the third pixel point is negatively correlated with the distance between the third pixel point and the first pixel point, that is, the greater the distance between the third pixel point and the first pixel point, the smaller the adjustment amplitude of the third pixel point. In an example, if the distance between the third pixel point and one first pixel point is 10 pixels, according to the distance and the first adjustment amplitude and the first adjustment direction of the first pixel point, it may be determined that the third adjustment amplitude of the third pixel point is adjustment by a distance of 10 pixels, and the third adjustment direction is a direction coming close to a first target point corresponding to the first pixel point. If the distance between the third pixel point and another first pixel point is 20 pixels, according to the distance and the first adjustment amplitude and the first adjustment direction of the another first pixel point, it may be determined that the third adjustment amplitude of the third pixel point is adjustment by a distance of 5 pixels, and the third adjustment direction is a direction coming close to a first target point corresponding to the another first pixel point. As shown in FIG. 10, the final adjustment amplitude and adjustment direction of the third pixel point may be determined according to a vector operation rule.

In a possible implementation, the third adjustment amplitude and the third adjustment direction of the third pixel point may be determined only according to the closest first pixel point. In an example, if the distance between the third pixel point and the closest first pixel point is 10 pixels, the third adjustment amplitude and the third adjustment direction of the third pixel point may be determined only according to the first adjustment amplitude and the first adjustment direction of the first pixel point. For example, if the first adjustment amplitude of the first pixel point is adjustment by a distance of 20 pixels and the first adjustment direction is a direction coming close to a first target point corresponding to the first pixel point, the third adjustment amplitude of the third pixel point is adjustment by a distance of 10 pixels and the third adjustment direction is a direction coming close to the first target point corresponding to the first pixel point.

In a possible implementation, when the first pixel point is adjusted, the reference pixel points in the second region may be adaptively adjusted. In an example, the second region is a waist region, and the second pixel point on the contour line of the second region may be adaptively adjusted. The second adjustment direction of the second pixel point is a direction coming close to its corresponding second target point, and the second adjustment amplitude of the second pixel point is negatively correlated with the minimum distance between the second pixel point and the first region. In an example, the minimum distance between the second pixel point and the first region may be represented as the distance of the second pixel point from the boundary between the first region and the second region. For example, the adjustment amplitude of a second pixel point having a distance of 20 pixels from the boundary is adjustment by a distance of 10 pixels, and the adjustment amplitude of a second pixel point having a distance of 30 pixels from the boundary is adjustment by a distance of 5 pixels.

In a possible implementation, when the second pixel point is adjusted, a fourth pixel point within a preset range around the second pixel point may be adjusted. The fourth adjustment amplitude of the fourth pixel point is negatively correlated with the distance between the fourth pixel point and the second pixel point, that is, the greater the distance between the fourth pixel point and the second pixel point, the smaller the adjustment amplitude of the fourth pixel point. In an example, if the distance between the fourth pixel point and a second pixel point with an adjustment amplitude being adjustment by a distance of 10 pixels is 10 pixels, according to the distance and the second adjustment amplitude and the second adjustment direction of the second pixel point, it may be determined that the fourth adjustment amplitude of the fourth pixel point is adjustment by a distance of 5 pixels, and the fourth adjustment direction is a direction coming close to a second target point corresponding to the second pixel point. If the distance between the fourth pixel point and another second pixel point with an adjustment amplitude being adjustment by a distance of 5 pixels is 20 pixels, according to the distance and the second adjustment amplitude and the second adjustment direction of the another second pixel point, it may be determined that the fourth adjustment amplitude of the fourth pixel point is adjustment by a distance of 2 pixels, and the fourth adjustment direction is a direction coming close to a second target point corresponding to the another second pixel point. As shown in FIG. 10, the final adjustment amplitude and adjustment direction of the fourth pixel point may be determined according to the vector operation rule.

In a possible implementation, the fourth adjustment amplitude and the fourth adjustment direction of the fourth pixel point may be determined only according to the closest second pixel point. In an example, if the distance between the fourth pixel point and the closest second pixel point is 10 pixels, the fourth adjustment amplitude and the fourth adjustment direction of the fourth pixel point may be determined only according to the second adjustment amplitude and the second adjustment direction of the second pixel point. For example, if the second adjustment amplitude of the second pixel point is adjustment by a distance of 10 pixels and the second adjustment direction is a direction coming close to a second target point corresponding to the second pixel point, the fourth adjustment amplitude of the fourth pixel point is adjustment by a distance of 5 pixels and the fourth adjustment direction is a direction coming close to the second target point corresponding to the second pixel point.

In a possible implementation, the background region outside the contour line may also be adaptively adjusted to avoid distortion of the background region.

Figure 11:
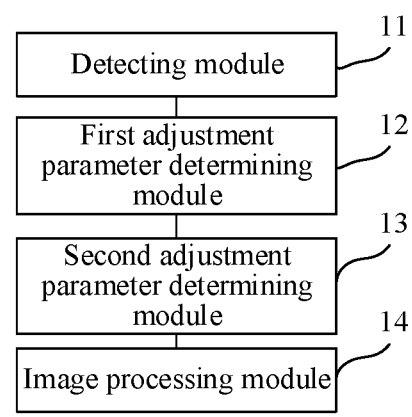
FIG. 11 is a block diagram of an image processing apparatus according to an embodiment of the present disclosure.

FIG. 11 is a block diagram of an image processing apparatus according to an embodiment of the present disclosure. As shown in FIG. 11, the image processing apparatus includes:

a detecting module 11, configured to perform inspection on an image to be processed, and determine a contour line of a target object in the image to be processed and a plurality of regions of the target object;

a first adjustment parameter determining module 12, configured to determine, for a selected first region in the plurality of regions, first adjustment parameters of a plurality of target pixel points in the first region according to set parameters, where the plurality of target pixel points includes a first pixel point on the contour line and a third pixel point inside the contour line;

a second adjustment parameter determining module 13, configured to determine, for a second region adjacent to the first region in the plurality of regions, second adjustment parameters of a plurality of reference pixel points in the second region, where the plurality of reference pixel points includes a second pixel point on the contour line and a fourth pixel point inside the contour line; and an image processing module 14, configured to adjust the image to be processed according to the first adjustment parameters and the second adjustment parameters to determine an adjusted image.

In a possible implementation, the first adjustment parameters include a first adjustment direction and a first adjustment amplitude of the first pixel point, and the second adjustment parameters include a second adjustment direction and a second adjustment amplitude of the second pixel point.

In a possible implementation, the first adjustment parameters further include a third adjustment direction and a third adjustment amplitude of the third pixel point.

In a possible implementation, the second adjustment parameters further include a fourth adjustment direction and a fourth adjustment amplitude of the fourth pixel point.

Figure 12:
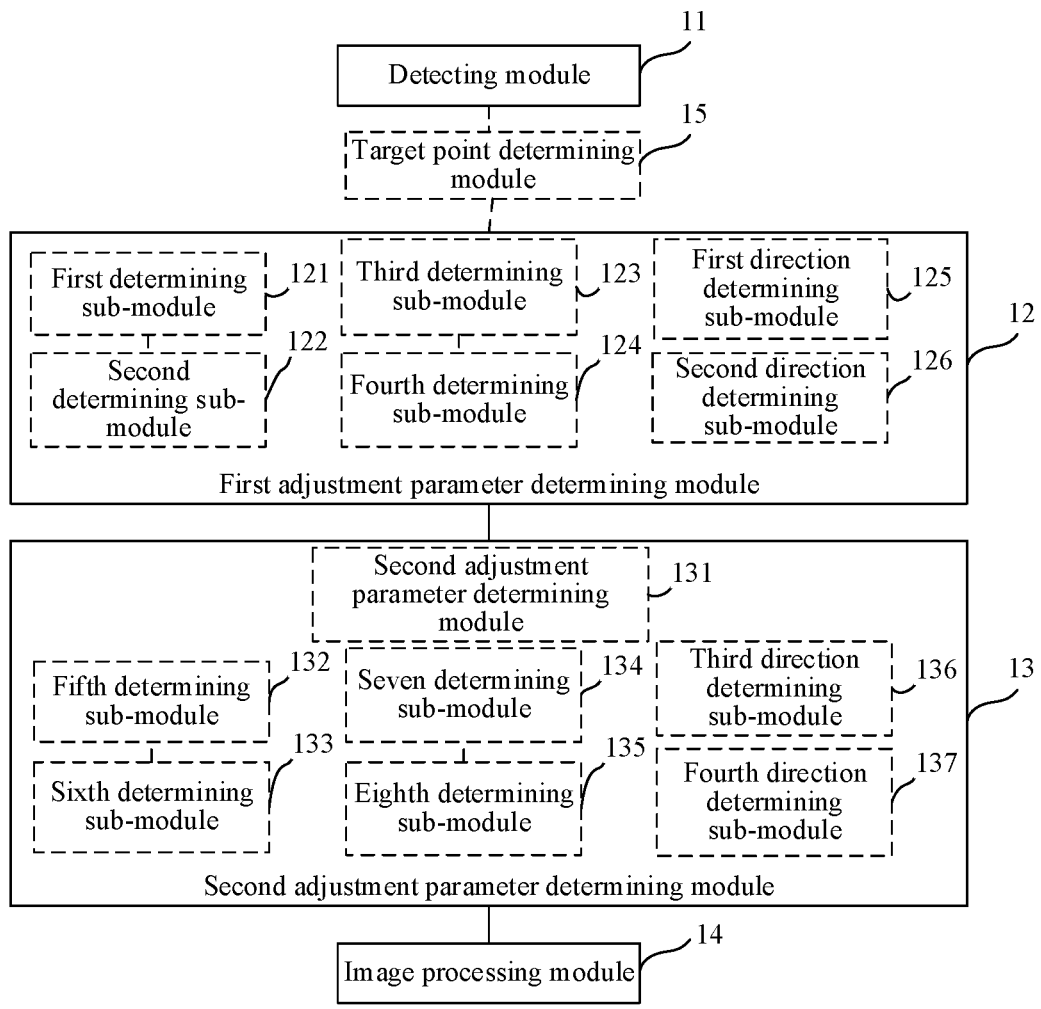
FIG. 12 is a block diagram of an image processing apparatus according to an embodiment of the present disclosure.

FIG. 12 is a block diagram of an image processing apparatus according to an embodiment of the present disclosure. As shown in FIG. 12, the apparatus further includes:

a target point determining module 15, configured to perform inspection on the image to be processed, and determine a first target point and a second target point of the target object in the image to be processed, where the first target point and the second target point are located inside the contour line, the first target point corresponds to the first pixel point, and the second target point corresponds to the second pixel point, where the first adjustment direction includes a direction coming close to or moving away from the first target point, and the second adjustment direction includes a direction coming close to or moving away from the second target point.

In a possible implementation, the first adjustment parameter determining module 12 includes:

a first determining sub-module 121, configured to determine the first adjustment direction and the first adjustment amplitude of the first pixel point according to the set parameters and the first target point; and a second determining sub-module 122, configured to determine a third adjustment direction and a third adjustment amplitude of each third pixel point within a preset range around each first pixel point according to the first adjustment direction and the first adjustment amplitude.

In a possible implementation, the first adjustment parameter determining module 12 includes:

a third determining sub-module 123, configured to determine the first adjustment direction and the first adjustment amplitude of each first pixel point according to the set parameters and the first target point; and a fourth determining sub-module 124, configured to determine the third adjustment direction and the third adjustment amplitude of the third pixel point according to the first adjustment direction and the first adjustment amplitude of a first pixel point closest to the third pixel point.

In a possible implementation, the first adjustment parameter determining module 12 includes one of:

a first direction determining sub-module 125, configured to determine the third adjustment direction as a direction coming close to the first target point if the first adjustment direction is the direction coming close to the first target point; and a second direction determining sub-module 126, configured to determine the third adjustment direction as a direction moving away from the first target point if the first adjustment direction is the direction moving away from the first target point.

In a possible implementation, the third adjustment amplitude of the third pixel point is smaller than the first adjustment amplitude, and the third adjustment amplitude of the third pixel point is negatively correlated with a second reference distance, where the second reference distance is a distance between the third pixel point and the first pixel point.

In a possible implementation, the second adjustment parameter determining module 13 includes:

a second adjustment parameter determining sub-module 131, configured to determine, for the second region adjacent to the first region in the plurality of regions, second adjustment parameters of the plurality of reference pixel points in the second region according to the first adjustment parameters.

In a possible implementation, the second adjustment parameter determining module 13 includes:

a fifth determining sub-module 132, configured to determine the second adjustment direction and the second adjustment amplitude of the second pixel point according to the first adjustment direction and the first adjustment amplitude of the first pixel point; and a sixth determining sub-module 133, configured to determine the fourth adjustment direction and the fourth adjustment amplitude of each fourth pixel point within a preset range around each second pixel point according to the second adjustment direction and the second adjustment amplitude.

In a possible implementation, the second adjustment parameter determining module 13 includes:

a seventh determining sub-module 134, configured to determine the second adjustment direction and the second adjustment amplitude of each second pixel point according to the first adjustment direction and the first adjustment amplitude of the first pixel point; and an eighth determining sub-module 135, configured to determine the fourth adjustment direction and the fourth adjustment amplitude of the fourth pixel point according to the second adjustment direction and the second adjustment amplitude of a second pixel point closest to the fourth pixel point.

In a possible implementation, the second adjustment parameter determining module 13 includes one of:

a third direction determining sub-module 136, configured to determine the second adjustment direction and the fourth adjustment direction as directions close to the second target point if the first adjustment direction is the direction coming close to the first target point; and a fourth direction determining sub-module 137, configured to determine the second adjustment direction and the fourth adjustment direction as directions moving away from the second target point if the first adjustment direction is the direction moving away from the first target point.

In a possible implementation, the second adjustment amplitude of the second pixel point is smaller than the first adjustment amplitude, and the second adjustment amplitude of the second pixel point is negatively correlated with a first reference distance, where the first reference distance is a minimum distance between the second pixel point and the first region.

In a possible implementation, the fourth adjustment amplitude of the fourth pixel point is smaller than the second adjustment amplitude of the second pixel point, and the fourth adjustment amplitude of the fourth pixel point is negatively correlated with a third reference distance, where the third reference distance is a distance between the fourth pixel point and the second pixel point.

It should be understood that the foregoing various method embodiments mentioned in the present disclosure may be combined with each other to form a combined embodiment without departing from the principle logic. Details are not described herein again due to space limitation.

In addition, the present disclosure further provides an image processing apparatus, an electronic device, a computer-readable storage medium, and a program, which can all be used to implement any of the image processing methods provided by the present disclosure. For the corresponding technical solutions and descriptions, please refer to the corresponding content in the method section. Details are not described herein again.

An embodiment of the present disclosure further provides a computer-readable storage medium, having computer program instructions stored thereon, where when the computer program instructions are executed by a processor, the foregoing methods are implemented. The computer-readable storage medium may be a non-volatile computer-readable storage medium.

An embodiment of the present disclosure further provides an electronic device, including: a processor; and a memory configured to store processor-executable instructions; where the processor is configured to execute the foregoing methods.

The electronic device may be provided as a terminal, a server, or other forms of devices.

Figure 13:
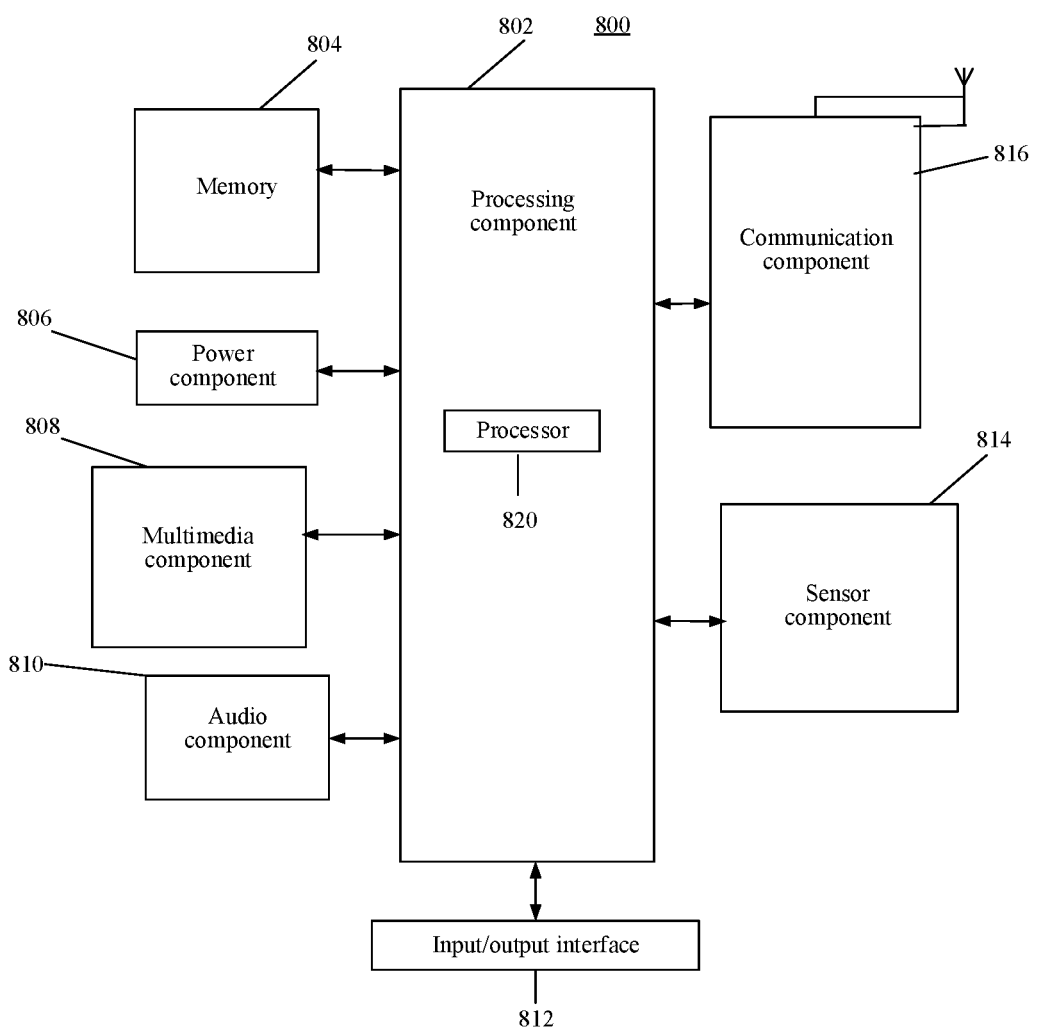
FIG. 13 is a block diagram of an electronic device according to exemplary embodiment.

FIG. 13 is a block diagram of an electronic device 800 according to exemplary embodiment. For example, the electronic device 800 may be a terminal such as a mobile phone, a computer, a digital broadcast terminal, a message transceiving device, a game console, a tablet device, a medical device, exercise equipment, and a personal digital assistant.

With reference to FIG. 13, the electronic device 800 may include one or more of the following components: a processing component 802, a memory 804, a power component 806, a multimedia component 808, an audio component 810, an Input/Output (I/O) interface 812, a sensor component 814, and a communication component 816.

The processing component 802 generally controls overall operation of the electronic device 800, such as operations associated with display, phone calls, data communications, camera operations, and recording operations. The processing component 802 may include one or more processors 820 to execute instructions to implement all or some of the steps of the methods above. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operations on the electronic device 800. Examples of the data include instructions for any application or method operated on the electronic device 800, contact data, contact list data, messages, pictures, videos, and etc. The memory 804 may be implemented by any type of volatile or non-volatile storage device, or a combination thereof, such as a Static Random-Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a disk or an optical disk.

The power component 806 provides power for various components of the electronic device 800. The power component 806 may include a power management system, one or more power supplies, and other components associated with power generation, management, and distribution for the electronic device 800.

The multimedia component 808 includes a screen between the electronic device 800 and a user that provides an output interface. In some embodiments, the screen may include a Liquid Crystal Display (LCD) and a Touch Panel (TP). If the screen includes a TP, the screen may be implemented as a touch screen to receive input signals from the user. The TP includes one or more touch sensors for sensing touches, swipes, and gestures on the TP. The touch sensor may not only sense the boundary of a touch or swipe action, but also detect the duration and pressure related to the touch or swipe operation. In some embodiments, the multimedia component 808 includes a front-facing camera and/or a rear-facing camera. When the electronic device 800 is in an operation mode, for example, a photography mode or a video mode, the front-facing camera and/or the rear-facing camera may receive external multimedia data. Each of the front-facing camera and the rear-facing camera may be a fixed optical lens system, or have focal length and optical zoom capabilities.

The audio component 810 is configured to output and/or input an audio signal. For example, the audio component 810 includes a microphone (MIC), and the microphone is configured to receive an external audio signal when the electronic device 800 is in an operation mode, such as a calling mode, a recording mode, and a voice recognition mode. The received audio signal may be further stored in the memory 804 or transmitted by means of the communication component 816. In some embodiments, the audio component 810 further includes a speaker for outputting the audio signal.

The I/O interface 812 provides an interface between the processing component 802 and a peripheral interface module, which may be a keyboard, a click wheel, a button, etc. The button may include, but is not limited to, a home button, a volume button, a start button, and a lock button.

The sensor component 814 includes one or more sensors for providing state assessment in various aspects for the electronic device 800. For example, the sensor component 814 may detect an on/off state of the electronic device 800, and relative positioning of components, which are the display and keypad of the electronic device 800, for example, and the sensor component 814 may further detect a position change of the electronic device 800 or a component of the electronic device 800, the presence or absence of contact of the user with the electronic device 800, the orientation or acceleration/deceleration of the electronic device 800, and a temperature change of the electronic device 800. The sensor component 814 may include a proximity sensor, which is configured to detect the presence of a nearby object when there is no physical contact. The sensor component 814 may further include a light sensor, such as a CMOS or CCD image sensor, for use in an imaging application. In some embodiments, the sensor component 814 may further include an acceleration sensor, a gyroscope sensor, a magnetic sensor, a pressure sensor, or a temperature sensor.

The communication component 816 is configured to facilitate wired or wireless communications between the electronic device 800 and other devices. The electronic device 800 may access a wireless network based on a communication standard, such as WiFi, 2G, or 3G, or a combination thereof. In an exemplary embodiment, the communication component 816 receives a broadcast signal or broadcast-related information from an external broadcast management system by means of a broadcast channel. In an exemplary embodiment, the communication component 816 further includes a Near Field Communication (NFC) module to facilitate short-range communication. For example, the NFC module may be implemented based on Radio Frequency Identification (RFID) technology, Infrared Data Association (IrDA) technology, Ultra-Wideband (UWB) technology, Bluetooth (BT) technology, and other technologies.

In an exemplary embodiment, the electronic device 800 may be implemented by one or more Application-Specific Integrated Circuits (ASICs), Digital Signal Processors (DSPs), Digital Signal Processing Devices (DSPDs), Programmable Logic Devices (PLDs), Field-Programmable Gate Arrays (FPGAs), controllers, microcontrollers, microprocessors, or other electronic elements, to execute the method above.

In an exemplary embodiment, a non-volatile computer-readable storage medium is further provided, for example, a memory 804 including computer program instructions, which can executed by the processor 820 of the electronic device 800 to implement the methods above.

Figure 14:
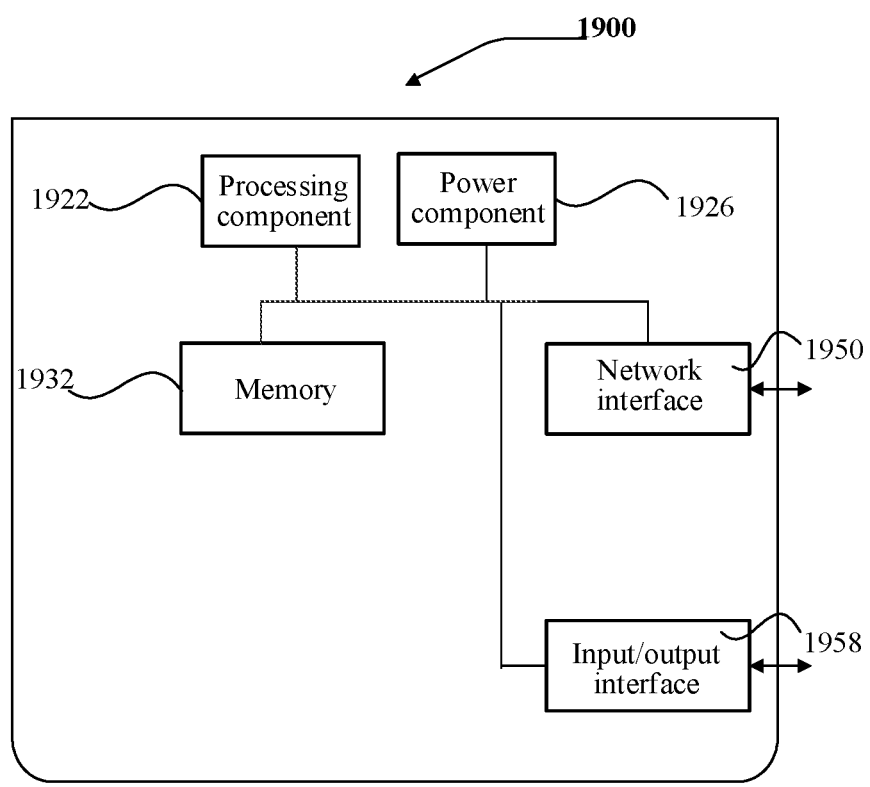
FIG. 14 is a block diagram of an electronic device according to exemplary embodiment.

FIG. 14 is a block diagram of an electronic device 1900 according to exemplary embodiment. For example, the electronic device 1900 may be provided as a server. With reference to FIG. 14, the electronic device 1900 includes a processing component 1922 which further includes one or more processors, and a memory resource represented by a memory 1932 and configured to store instructions executable by the processing component 1922, for example, an application program. The application program stored in the memory 1932 may include one or more modules, each of which corresponds to a set of instructions. Further, the processing component 1922 may be configured to execute instructions so as to execute the above methods.

The electronic device 1900 may further include a power component 1926 configured to execute power management of the electronic device 1900, a wired or wireless network interface 1950 configured to connect the electronic device 1900 to the network, and an I/O interface 1958. The electronic device 1900 may be operated based on an operating system stored in the memory 1932, such as Windows Server™, Mac OS X™, Unix™, Linux™, FreeBSD™ or the like.

In an exemplary embodiment, a non-volatile computer-readable storage medium is further provided, for example, a memory 1932 including computer program instructions, which can executed by the processing component 1922 of the electronic device 1900 to implement the methods above.

The present disclosure may be a system, a method, and/or a computer program product. The computer program product may include a computer-readable storage medium having computer-readable program instructions thereon for causing a processor to carry out aspects of the present disclosure.

The computer-readable storage medium may be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. More specific examples (a non-exhaustive list) of the computer-readable storage medium include: a portable computer diskette, a hard disk, a Random Access Memory (RAM), an ROM, an EPROM (or a flash memory), a SRAM, a portable Compact Disk Read-Only Memory (CD-ROM), a Digital Versatile Disc (DVD), a memory stick, a floppy disk, a mechanically encoded device such as punch-cards or raised structure in a groove having instructions stored thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a Local Area Network (LAN), a wide area network and/or a wireless network. The network may include copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer program instructions for carrying out operations of the present disclosure may be assembler instructions, Instruction-Set-Architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In a scenario involving a remote computer, the remote computer may be connected to the user's computer through any type of network, including a LAN or a Wide Area Network (WAN), or the connection may be made to an external computer (for example, through the Internet using an Internet service provider). In some embodiments, electronic circuitry including, for example, programmable logic circuitry, Field-Programmable Gate Arrays (FGPAs), or Programmable Logic Arrays (PLAs) may execute the computer-readable program instructions by utilizing state information of the computer-readable program instructions to personalize the electronic circuitry, in order to implement the aspects of the present disclosure.

The aspects of the present disclosure are described herein with reference to flowcharts and/or block diagrams of methods, apparatuses (systems), and computer program products according to the embodiments of the present disclosure. It should be understood that each block of the flowcharts and/or block diagrams, and combinations of the blocks in the flowcharts and/or block diagrams can be implemented by computer-readable program instructions.

These computer-readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can cause a computer, a programmable data processing apparatus, and/or other devices to function in a particular manner, such that the computer-readable medium having instructions stored therein includes an article of manufacture instructing instructions which implement the aspects of the functions/acts specified in one or more blocks of the flowcharts and/or block diagrams.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus or other device implement the functions/acts specified in one or more blocks of the flowcharts and/or block diagrams.

The flowcharts and block diagrams in the accompanying drawings illustrate the architecture, functionality and operations of possible implementations of systems, methods, and computer program products according to multiple embodiments of the present disclosure. In this regard, each block in the flowchart of block diagrams may represent a module, segment, or portion of instruction, which includes one or more executable instructions for implementing the specified logical function(s). In some alternative implementations, the functions noted in the block may also occur out of the order noted in the accompanying drawings. For example, two blocks shown in succession may, in fact, be executed substantially concurrently, or the blocks may sometimes be executed in the reverse order, depending upon the functionality involved. It should also be noted that each block of the block diagrams and/or flowcharts, and combinations of blocks in the block diagrams and/or flowcharts, can be implemented by special purpose hardware-based systems that perform the specified functions or acts or carried out by combinations of special purpose hardware and computer instructions.

The descriptions of the embodiments of the present disclosure have been presented for purposes of illustration, but are not intended to be exhaustive or limited to the embodiments disclosed. Many modifications and variations will be apparent to a person of ordinary skill in the art without departing from the scope and spirit of the described embodiments. The terminology used herein was chosen to best explain the principles of the embodiments, the practical application or technical improvement over technologies found in the marketplace, or to enable other persons of ordinary skill in the art to understand the embodiments disclosed herein.

The invention claimed is:

1. An image processing method, comprising:
performing inspection on an image to be processed, and determining a contour line of a target object in the image to be processed and a plurality of regions of the target object;
determining, for a selected first region in the plurality of regions, first adjustment parameters of a plurality of target pixel points in the first region according to set parameters, wherein the plurality of target pixel points comprises first pixel points on the contour line and third pixel points inside the contour line;
determining, for a second region adjacent to the first region in the plurality of regions, second adjustment parameters of a plurality of reference pixel points in the second region, wherein the plurality of reference pixel points comprises second pixel points on the contour line and fourth pixel points inside the contour line; and
adjusting the image to be processed according to the first adjustment parameters and the second adjustment parameters to determine an adjusted image, wherein the first adjustment parameters comprise a first adjustment direction and a first adjustment amplitude of each first pixel point, and the second adjustment parameters comprise a second adjustment direction and a second adjustment amplitude of each second pixel point, wherein the second adjustment amplitude of each second pixel point is smaller than the first adjustment amplitude, and the second adjustment amplitude of each second pixel point is negatively correlated with a first reference distance, and wherein the first reference distance is a minimum distance between the second pixel point and the first region.

2. The method according to claim 1, wherein the determining, for a second region adjacent to the first region in the plurality of regions, second adjustment parameters of a plurality of reference pixel points in the second region comprises:

determining, for the second region adjacent to the first region in the plurality of regions, the second adjustment parameters of the plurality of reference pixel points in the second region according to the first adjustment parameters.

3. The method according to claim 1, further comprising:

performing inspection on the image to be processed, and determining first target points and second target points of the target object in the image to be processed, wherein the first target points and the second target points are located inside or on the contour line, the first target points correspond to respective first pixel points, and the second target points correspond to respective second pixel points, wherein each first adjustment direction comprises a direction coming close to or moving away from a respective one of the first target points, and each second adjustment direction comprises a direction coming close to or moving away from a respective one of the second target points.

4. The method according to claim 3, wherein the first adjustment parameters further comprise a third adjustment direction and a third adjustment amplitude of each third pixel point.

5. The method according to claim 4, wherein the determining, for a selected first region in the plurality of regions, first adjustment parameters of a plurality of target pixel points in the first region according to set parameters comprises:

determining the first adjustment direction and the first adjustment amplitude of each first pixel point according to the set parameters and the respective one of the first target points; and determining the third adjustment direction and the third adjustment amplitude of each third pixel point within a preset range around each first pixel point according to the first adjustment direction and the first adjustment amplitude.

6. The method according to claim 4, wherein the determining, for a selected first region in the plurality of regions, first adjustment parameters of a plurality of target pixel points in the first region according to set parameters comprises:

determining the first adjustment direction and the first adjustment amplitude of each first pixel point according to the set parameters and the respective one of the first target points; and determining the third adjustment direction and the third adjustment amplitude of the third pixel point according to the first adjustment direction and the first adjustment amplitude of a first pixel point closest to the third pixel point.

7. The method according to claim 4, wherein the third adjustment amplitude of the third pixel point is smaller than the first adjustment amplitude, and the third adjustment amplitude of the third pixel point is negatively correlated with a second reference distance, wherein the second reference distance is a distance between the third pixel point and the first pixel point.

8. The method according to claim 4, wherein the determining, for a selected first region in the plurality of regions, first adjustment parameters of a plurality of target pixel points in the first region according to set parameters comprises one of:

determining the third adjustment direction as a direction coming close to the first target point in response to the first adjustment direction being the direction coming close to the first target point; and determining the third adjustment direction as a direction moving away from the first target point in response to the first adjustment direction being the direction moving away from the first target point.

9. The method according to claim 1, wherein the second adjustment parameters further comprise a fourth adjustment direction and a fourth adjustment amplitude of each fourth pixel point.

10. The method according to claim 9, wherein the determining, for a second region adjacent to the first region in the plurality of regions, second adjustment parameters of a plurality of reference pixel points in the second region comprises:

determining the second adjustment direction and the second adjustment amplitude of the second pixel point according to the first adjustment direction and the first adjustment amplitude of the first pixel point; and determining the fourth adjustment direction and the fourth adjustment amplitude of each fourth pixel point within a preset range around each second pixel point according to the second adjustment direction and the second adjustment amplitude.

11. The method according to claim 9, wherein the determining, for a second region adjacent to the first region in the plurality of regions, second adjustment parameters of a plurality of reference pixel points in the second region comprises:

determining the second adjustment direction and the second adjustment amplitude of each second pixel point according to the first adjustment direction and the first adjustment amplitude of the first pixel point; and determining the fourth adjustment direction and the fourth adjustment amplitude of the fourth pixel point according to the second adjustment direction and the second adjustment amplitude of a second pixel point closest to the fourth pixel point.

12. The method according to claim 9, wherein the fourth adjustment amplitude of the fourth pixel point is smaller than the second adjustment amplitude of the second pixel point, and the fourth adjustment amplitude of the fourth pixel point is negatively correlated with a third reference distance, wherein the third reference distance is a distance between each fourth pixel point and the second pixel point.

13. The method according to claim 9, wherein the determining, for a second region adjacent to the first region in the plurality of regions, second adjustment parameters of a plurality of reference pixel points in the second region comprises one of:
- determining the second adjustment direction and the fourth adjustment direction as directions close to the second target point in response to the first adjustment direction being the direction coming close to the first target point; and
- determining the second adjustment direction and the fourth adjustment direction as directions away from the second target point in response the first adjustment direction being the direction moving away from the first target point.

14. An image processing apparatus, comprising:
- a memory storing processor-executable instructions; and
- a processor arranged to execute the stored processor-executable instructions to perform steps of:
  - performing inspection on an image to be processed, and determine a contour line of a target object in the image to be processed and a plurality of regions of the target object;
  - determining, for a selected first region in the plurality of regions, first adjustment parameters of a plurality of target pixel points in the first region according to set parameters, wherein the plurality of target pixel points comprises first pixel points on the contour line and third pixel points inside the contour line;
  - determining, for a second region adjacent to the first region in the plurality of regions, second adjustment parameters of a plurality of reference pixel points in the second region, wherein the plurality of reference pixel points comprises second pixel points on the contour line and fourth pixel points inside the contour line; and
  - adjusting the image to be processed according to the first adjustment parameters and the second adjustment parameters to determine an adjusted image,
  - wherein the first adjustment parameters comprise a first adjustment direction and a first adjustment amplitude of each first pixel point, and the second adjustment parameters comprise a second adjustment direction and a second adjustment amplitude of each second pixel point,
  - wherein the second adjustment amplitude of each second pixel point is smaller than the first adjustment amplitude, and the second adjustment amplitude of each second pixel point is negatively correlated with a first reference distance,
  - wherein the first reference distance is a minimum distance between the second pixel point and the first region.

15. The apparatus according to claim 14, wherein the determining, for a second region adjacent to the first region in the plurality of regions, second adjustment parameters of a plurality of reference pixel points in the second region comprises:
- determining, for the second region adjacent to the first region in the plurality of regions, the second adjustment parameters of the plurality of reference pixel points in the second region according to the first adjustment parameters.

16. The apparatus according to claim 14, wherein the processor is arranged to execute the stored processor-executable instructions to further perform steps of:
- performing inspection on an image to be processed, and determining first target points and second target points of the target object in the image to be processed, wherein the first target points and the second target points are located inside or on the contour line, the first target points correspond to respective first pixel points, and the second target points correspond to respective second pixel points,
- wherein each first adjustment direction comprises a direction coming close to or moving away from a respective one of the first target points, and each second adjustment direction comprises a direction coming close to or moving away from a respective one of the second target points.

17. A non-transitory computer-readable storage medium having stored thereon computer instructions that, when executed by a processor, cause the processor to perform an image processing method, the method comprising:
- performing inspection on an image to be processed, and determining a contour line of a target object in the image to be processed and a plurality of regions of the target object;
- determining, for a selected first region in the plurality of regions, first adjustment parameters of a plurality of target pixel points in the first region according to set parameters, wherein the plurality of target pixel points comprises first pixel points on the contour line and third pixel points inside the contour line;
- determining, for a second region adjacent to the first region in the plurality of regions, second adjustment parameters of a plurality of reference pixel points in the second region, wherein the plurality of reference pixel points comprises second pixel points on the contour line and fourth pixel points inside the contour line; and
- adjusting the image to be processed according to the first adjustment parameters and the second adjustment parameters to determine an adjusted image,
- wherein the first adjustment parameters comprise a first adjustment direction and a first adjustment amplitude of each first pixel point, and the second adjustment parameters comprise a second adjustment direction and a second adjustment amplitude of each second pixel point,
- wherein the second adjustment amplitude of each second pixel point is smaller than the first adjustment amplitude, and the second adjustment amplitude of each second pixel point is negatively correlated with a first reference distance,
- wherein the first reference distance is a minimum distance between the second pixel point and the first region.

* * * * *